April 9, 1968  F. HERBSTHOFER  3,376,873
THRESHING MECHANISM
Filed June 3, 1965  6 Sheets-Sheet 1

Inventor
FRANZ HERBSTHOFER
By
Tweedale & Gerhardt
Attorneys

Inventor
FRANZ HERBSTHOFER

By Tweedale & Gerhardt
Attorneys

April 9, 1968     F. HERBSTHOFER     3,376,873
THRESHING MECHANISM

Filed June 3, 1965     6 Sheets-Sheet 4

Inventor
FRANZ HERBSTHOFER
By
Tweedale & Gerhardt
Attorneys

April 9, 1968   F. HERBSTHOFER   3,376,873
THRESHING MECHANISM
Filed June 3, 1965   6 Sheets-Sheet 5

Inventor
FRANZ HERBSTHOFER
By
Tweedale & Gerhardt
Attorneys

Inventor
FRANZ HERBSTHOFER
By
Tweedale & Gerhardt
Attorneys

United States Patent Office 3,376,873
Patented Apr. 9, 1968

3,376,873
THRESHING MECHANISM
Franz Herbsthofer, Kassel-Harleshausen, Germany, assignor to Massey-Ferguson G.m.b.H., Kassel, Germany
Filed June 3, 1965, Ser. No. 460,942
Claims priority, application Great Britain, June 4, 1964, 23,121/64
3 Claims. (Cl. 130—27)

ABSTRACT OF THE DISCLOSURE

A threshing assembly including a casing having first and second frusto-conical portions disposed in coaxial, end to end relationship and a third coaxial, part-cylindrical portion at the end of the second frusto-conical portion. A sieve covers the casing and a rotor is journalled coaxially within the casing for cooperation with a concave and with the casing wall to thresh and advance the material axially from the first casing portion to the third portion for discharge.

---

This invention relates to a cut crop threshing and separating assembly for removing grain or seed (hereinafter referred to simply as "grain") from the cut crop, and relates particularly but not exclusively to such an assembly suitable for use in a combined harvesting and threshing machine (referred to hereinafter and in the claims as "combine harvester").

The functions of grain threshing and of separating the grain from the straw, chaff and trash in a conventional combine are performed by separate mechanisms. The harvested grain is first conveyed to a threshing cylinder by means of which most of the grain is separated and fed directly to a grain cleaning mechanism. However, an appreciable amount of grain is entrapped in the straw, and to recover this the threshed straw is deposited on oscillating straw walkers which jog the straw and trash rearwardly out of the combine while allowing the grain to fall free. This straw walker type of separating mechanism is bulky and heavy as well as adding to the complexity and power demands of the combine. Moreover, the straw walkers usually impose a capacity limit on combine performance and restrict the crops that can be efficiently handled.

According to the present invention there is provided a cut crop threshing and separating assembly comprising a threshing stage having a drum and a concave and a separating stage having a rotatable separating drum and a sieve, said stages being arranged in series and so that the crop may feed from the threshing stage axially of its drum to the separating stage and through the latter axially of the separating drum.

Preferably, there is provided a stationary outer casing, and in which the separating and threshing drums are arranged end to end to form a rotor rotatably mounted within the casing, a feed opening in the casing to the threshing stage for entry of material to be threshed, said outer casing including the concave and sieve.

In order that the invention may be more fully understood, an embodiment will now be described with reference to the accompanying drawings in which.

Figure 1:
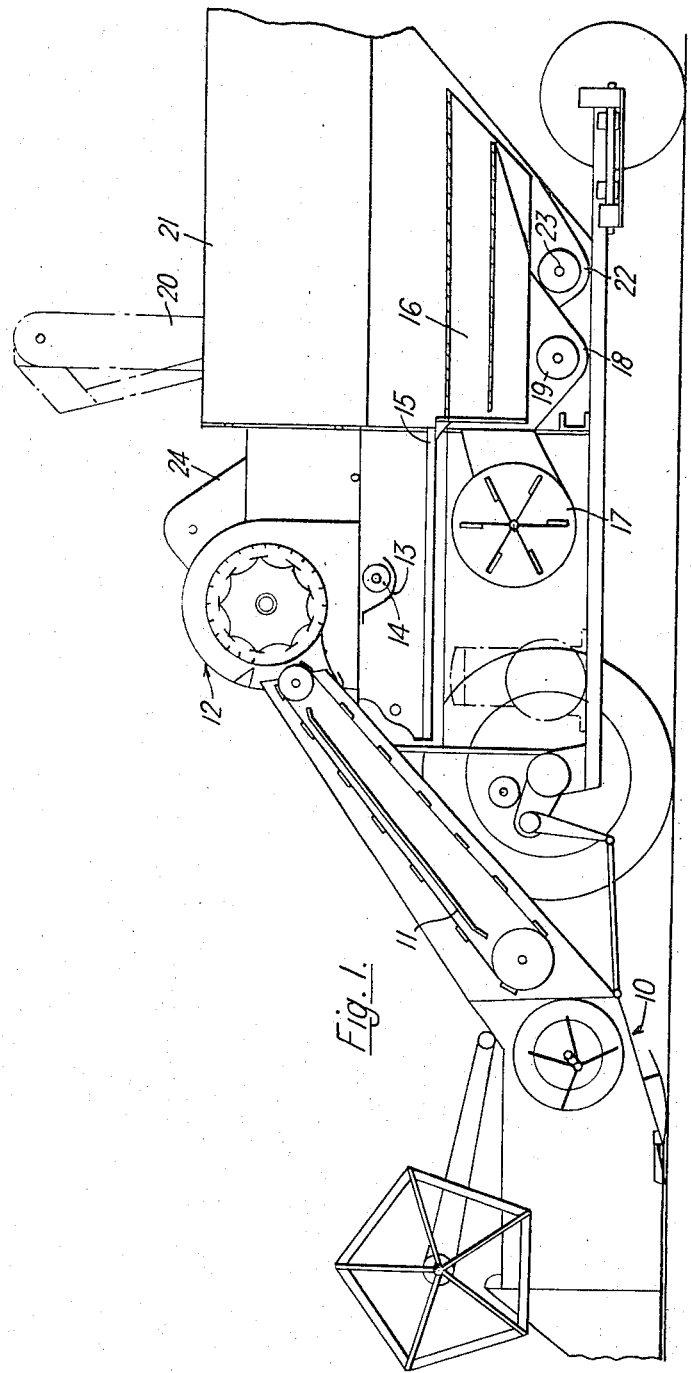
FIG. 1 is a diagrammatic side elevation of a combine harvester including a threshing and separating assembly according to the invention.

Referring to FIG. 1, a combine harvester includes a header unit 10 for cutting and collecting the cut crop and transferring it by means of a conveyor 11 to a threshing and separating assembly 12. This assembly threshes the crop and separates the grain from the straw in a manner to be described. Straw passes out of the side of the assembly and through a chute to the ground. The threshed grain passes through the assembly and is collected in a trough 13 from which it is spread evenly, by use of an auger 14, onto a grain pan 15, which conveys it to a cleaning mechanism including a shaker shoe 16 and fan 17. The cleaned grain is passed into the trough 18 from which it is delivered to the side of the machine by means of an auger 19, and to a grain tank 21 by an elevator 20. Suitable means, not shown, are provided to unload the tank when it is full. The gleanings are collected in the trough 22 and delivered by an auger 23 to an elevator 24 which returns them to the threshing and separating assembly 12 for further treatment.

With reference particularly to FIGS. 2 to 6, the threshing and separating assembly 12 comprises a casing having frusto-conical first and second portions 28, 29 respectively and a part-cylindrical third portion 30. The casing is closed at each end and is supported by walls 31, 32 rigidly attached to the combine frame, further support being provided by annular discs 33, 34 also rigidly attached to the frame and respectively at the division between the first and second, and the second and third portions.

Each outer wall carries bearings 35, 36 supporting the shaft 37 of a rotor 38 so that its axis of rotation is coaxial with the central axis of the casing. The rotor shaft 37 extends through the casing at one end and has rigidly attached thereto a sprocket 39 or other suitable driving means. The rotor 38 is of a configuration similar to the casing in that it comprises generally frusto-conical first and second portions 40, 41 respectively and a cylindrical third portion 42, the first portion 40 forming a threshing drum and the second portion 41 forming a separating drum. The rotor first portion 40 and casing first portion 28 together form a threshing stage, and the rotor second portion 41 and casing second portion 29 together form a separating stage as will be hereinafter explained.

Figure 2:
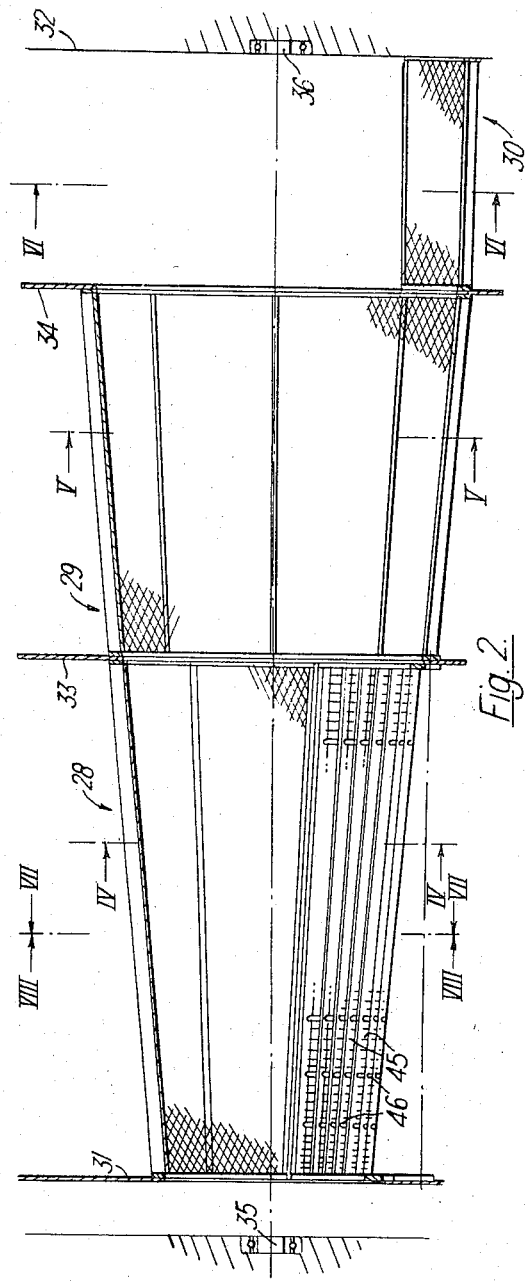
FIG. 2 is an elevation of part of the assembly.
Figure 3:
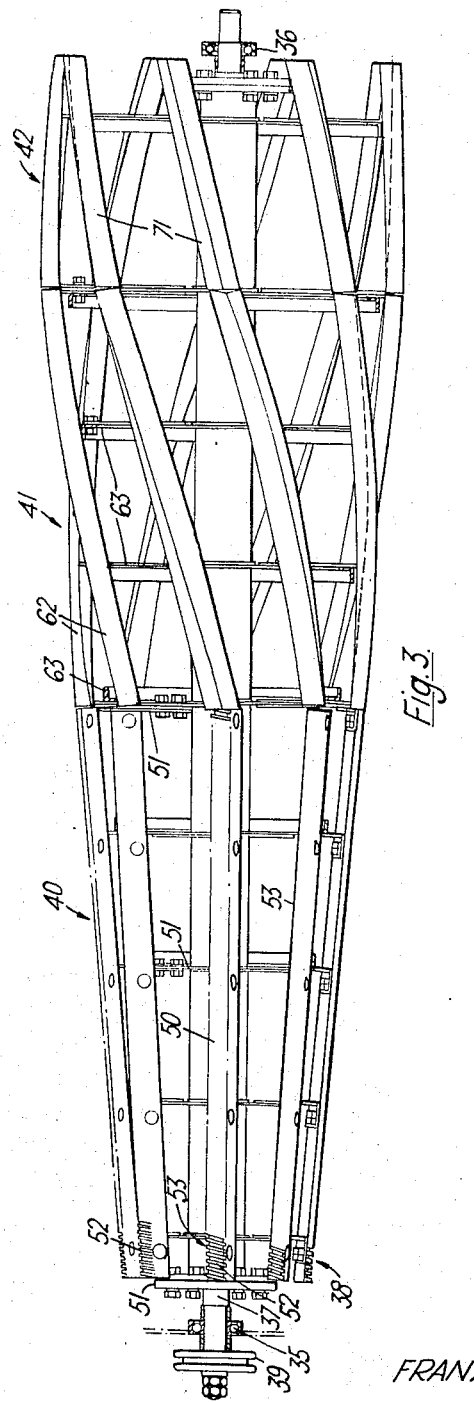
FIG. 3 is an elevation of a rotor of the assembly.
Figure 4:
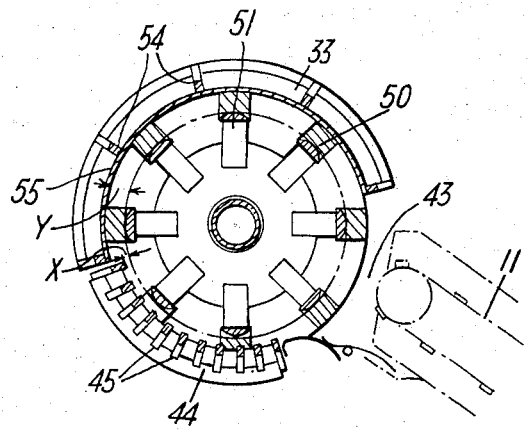
FIGS. 4, 5 and 6 are, respectively, sectional elevations taken on the lines IV—IV, V—V and VI—VI of FIG. 2 with the rotor in position.
Figure 5:
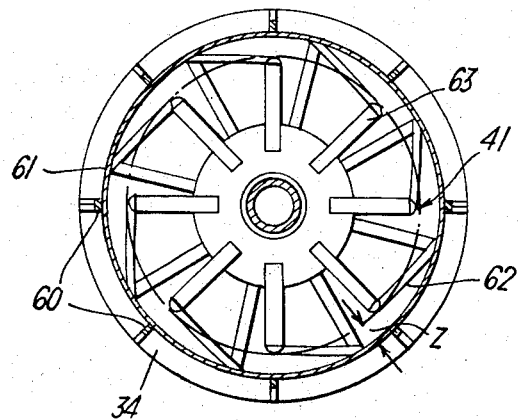
Figure 6:
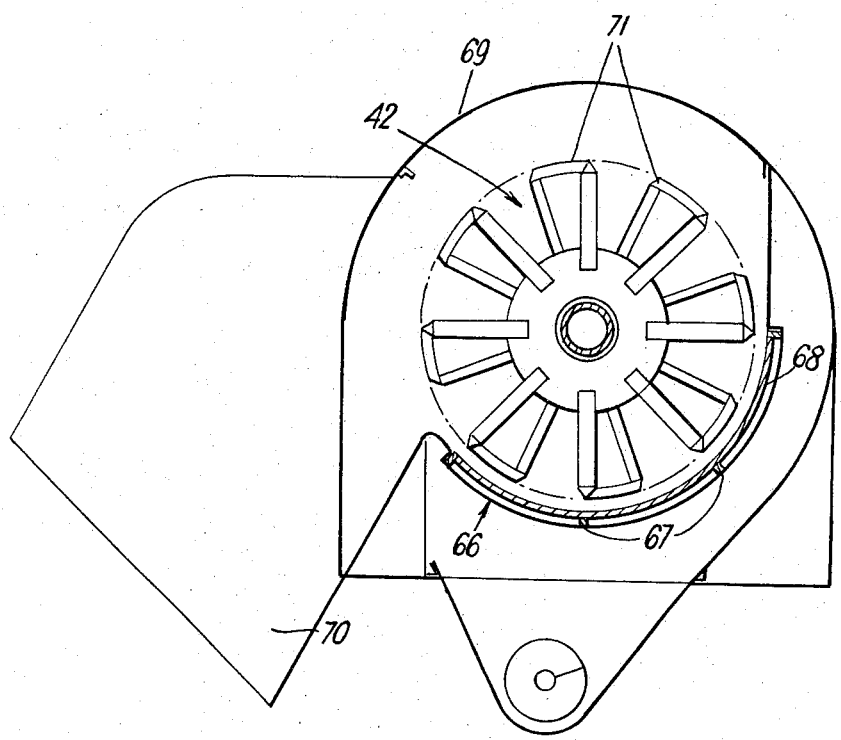

Referring particularly to FIGS. 2, 3 and 4, the elevator 11 extends to a point close to the outer casing to deliver the cut crop through a peripheral opening 43 extending over part of the width of the first portion 28 of the casing. Extending from the bottom edge of the opening 43 is a concave 44 including transverse rub bars 45 and longitudinal wires 46. This concave 44 conforms to an arc of the surface of a frusto-conical body.

The rotor first portion 40 is of substantially the same width as the concave and has an outer surface of similar frusto-conical shape, the surface being formed by a series of beater bars 50 disposed equi-distant around the shaft 37 and attached thereto by suitable fixing and supporting means 51 spaced along the shaft. Each beater bar includes serrations 52 which, from the leading edge 53 of the bar, extend rearwardly and are inclined towards the wider end of the rotor 38.

Extending from the longitudinal side of the concave 44 to form the remainder of the casing of the first portion 28 is a screen including longitudinally extending bars 54 supporting a sieve 55. It is preferred that this sieve be made of expanded metal, the holes in the metal being of a suitable size to allow the passage of the grain but not straw.

From reference to FIG. 4 it will be seen that the clearance X between the concave 44 and the rotor beater bars 50 is less than the clearance Y between the sieve 55 and the beater bars 50.

The second portion 29 of the casing is frusto-conical and includes a series of bars extending between the discs 33, 34 and supporting a frusto-conical sieve 61 similar to the sieve 55. The complementary second portion 41 of the rotor 38 is similar in shape to the casing and includes on its outer periphery a series of impeller or beater bars 62 rigidly attached to the shaft 37 through suitable fastening means 63. The impeller bars 62 are of triangular cross-section and are helically disposed, an apex of the triangle forming the outer edge and the direction of the helix being such that during rotation the bars 62 tend to move material to the right as viewed in FIGS. 2 and 3. Alternatively, the bars 62 may be of inverted V-shape cross-section.

In the separating stage, the clearance Z between the impeller bars 62 and the sieve 61 is substantially the same as the clearance Y in the threshing stage.

The third portion 30 of the casing has a lower part 66 forming an arc of a cylinder and including, in a similar manner to the second portion 26, a screen formed by a sieve 68 supported by bars 67 extending from the disc 34 to the wall 32. The upper portion of the casing forms a housing 69 merging with a straw discharge outlet 70. The third rotor portion 42 is also of cylindrical cross-section but otherwise is of the same construction as the second portion 41; that is, it has helically disposed impeller bars 71 of triangular cross-section.

In operation, the cut crop is fed through the peripheral opening 43 by the elevator 11 where it is engaged by and rubbed between the beater bars 50 and the rub bars 45 in a manner similar to that in a known threshing mechanism. At the same time, it is moved in the direction of the rotor; that is, to the right in FIGS. 2 and 3. During the passage of the crop over the concave, nearly all of the grain is threshed from the straw and some of it drops through the concave. Further movement transfers the crop from the concave to the area between the sieve 55 and the beater bars 50, where, due to the greater clearance Y and the fact that the screen is a relatively smooth surface, very little further threshing takes place and the material is now agitated and propelled round with the rotor and towards the second portion. During this process, some of the remaining grain is separated from the straw, the grain passing through the sieve 55. It will be noted that in this threshing stage, the beater bars 50 are not helically disposed and the axial movement of the crop is due mainly to centrifugal force, the conical construction of the casing and rotor, and also to some extent, by the serrations on the beater bars 50.

When the material enters the separating stage, it is acted on by the impeller bars 62, agitated and moved axially in the direction of the third portion. Further grain remaining in the crop is separated and allowed to pass through the sieve 61. In this case, the axial movement is due both to centrifugal force tending to move the crop to the wider end and also to the helical disposition of the impeller bars 62. The material will, therefore, be axially moved at a greater velocity than in the threshing stage.

In the third portion, a final separation of grain from straw is effected over the sieve portion 68 and the straw is then thrown out through the chute 70. In this third portion, the helical disposition of the beater bars alone is now sufficient since it is only necessary to ensure that the crop is received, and moved axially away from the separating stage.

Figure 7:
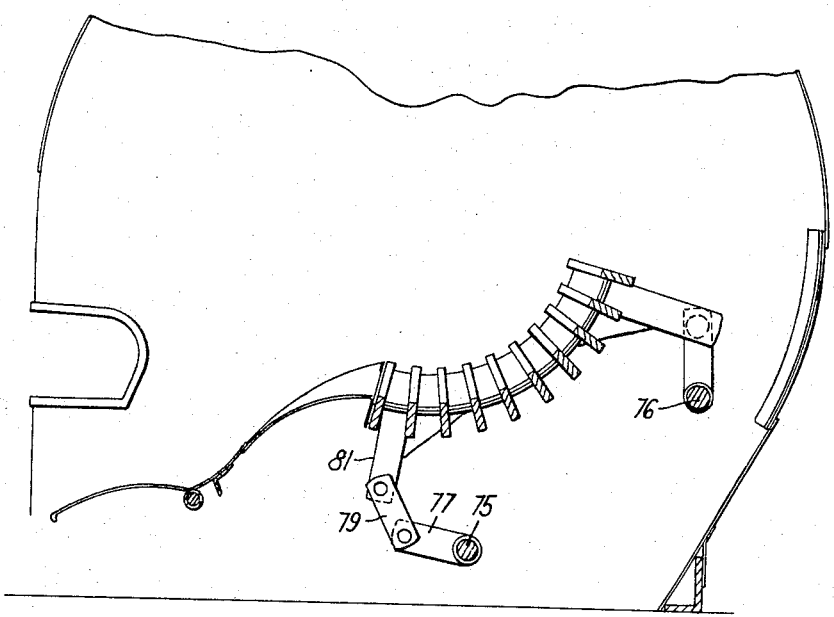
FIGS. 7 and 8 are part sectional elevations in the direction VII—VII and VIII—VIII of FIG. 2 respectively and show details.
Figure 8:
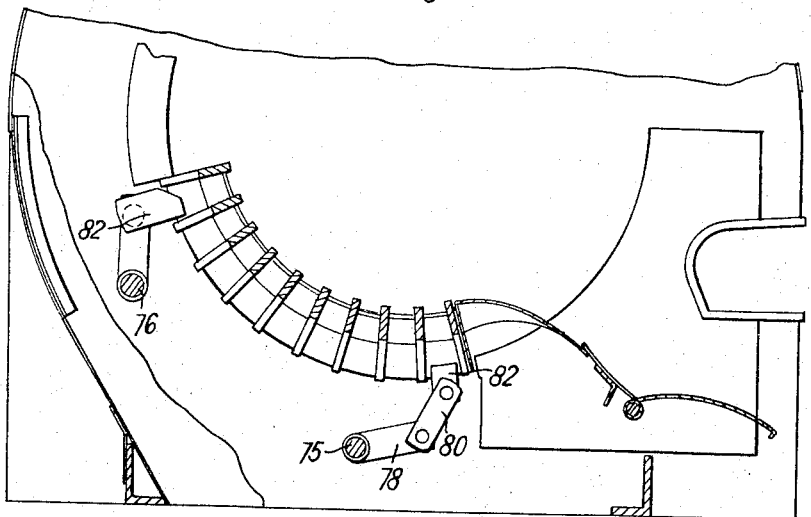

It is desirable that the assembly be able to handle various types of cut crops and for this purpose the clearance between the concave 44 and the rotor 38 is adjustable. Referring to FIGS. 7 and 8, two shafts 75, 76 situated near the longitudinal sides of the concave 44, respectively, extend underneath the concave and parallel to the axis of the rotor 38. The shaft 75 carries arms 77, 78 at points adjacent to the narrow and wide ends, respectively, of the concave 44, the arms being connected through links 79, 80 to arms 81, 82 rigidly attached to one side of the concave 44.

The shaft 76 carries arms 81, 82 similar to the arms 77, 78 on the shaft 75, these being directly connected to arms 83, 84 attached to the other side of the concave 44.

Suitable adjustment means are provided on the harvester to rotate the shafts 75, 76 and hence, through the above described linkage, vary the clearance between the rotor 38 and the concave 44. Separate means may be provided to rotate each shaft 75, 76 in which case the clearance at one side of the concave 44 may be made different from that at the other side, or alternatively, the rods may be linked in any suitable manner so that both clearances are automatically adjusted together. In the latter case, of course, the arrangement will be such that any adjustment to the rear clearance will cause a corresponding smaller adjustment to the front clearance, so as to maintain the usual arrangement in which the front clearance is always smaller than the rear clearance, by an approximately constant ratio.

The means for collecting the grain passing through the concave and screen is not shown and may comprise any suitable arrangement of conveyor for collecting the grain and passing it to the spreading auger 14. It is preferred to use auger-type conveyors which may be arranged close to the screen to give some cleaning effect thereto.

It will be apparent to those skilled in the art that the invention is not limited to the exact construction illustrated, but that various alterations and modifications in the construction and arrangement of parts can be made without departing from the scope and spirit of the invention.

I claim:

1. A cut crop threshing and separating assembly comprising a threshing stage and a separating stage, said threshing stage having a concave and a rotatable threshing drum, said drum and said concave each being formed in a frusto-conical shape, said drum having a plurality of circumferentially spaced bars whose outer ends form a frustum, said concave having a plurality of circumferentially spaced rub bars whose inner ends form a segment of a frustum, said separating stage being axially aligned with said threshing stage and including a rotatable separating drum and a sieve, and means for adjusting the clearance between said threshing drum bars and said concave rub bars.

2. An assembly according to claim 1 in which said means comprises a pair of shafts substantially parallel to the concave rub bars and linkage connecting the shafts and rub bars so that rotation of the shaft causes an increase or decrease in said clearance.

3. A crop threshing and separating assembly comprising a pair of spaced outer walls; a casing mounted between said walls including first, second and third portions disposed successively in coaxial, end to end relationship; said first and second portions being of frusto-conical configuration and said third portion being of part-cylindrical configuration; a rotor journalled in said outer walls; said rotor having first, second and third portions coaxially received within said first, second and third casing portions, respectively; said first rotor portion comprising a threshing drum of generally frusto-conical configuration, said second rotor portion comprising a separating drum of generally frusto-conical configuration, and said third rotor portion being of generally cylindrical configuration; a peripheral opening in the wall of the first casing portion; a sieve enclosing the remainder of said first and second portions; a concave extending over a part of said opening in said casing first portion; a series of longitudinal beater bars on the rotor first portion disposed equi-distant about the rotor axis cooperable with said concave upon rotation of said rotor to thresh crop material received in said opening and advance said crop material toward said second casing portion; and a series of helical bars on the periphery of said rotor second portion disposed equi-distant from the rotor axis and cooperable with said sieve for advancing the crop material to the third casing portion and centrifugally separating grain from the crop material and causing it to pass through the sieve.

References Cited

UNITED STATES PATENTS

| | | | |
|---|---|---|---|
| 2,050,631 | 7/1936 | Schlayer | 130—27.17 |
| 2,053,148 | 9/1936 | James | 130—27.17 |
| 2,577,329 | 12/1951 | Irvine | 130—27.11 |
| 3,212,243 | 10/1965 | Mark et al. | 56—21 |
| 3,296,782 | 1/1967 | Mark et al. | 130—27 |

ANTONIO F. GUIDA, *Primary Examiner.*